(12) United States Patent
Takanashi

(10) Patent No.: US 12,430,035 B2
(45) Date of Patent: Sep. 30, 2025

(54) STORAGE APPARATUS

(71) Applicant: Hitachi, Ltd., Tokyo (JP)

(72) Inventor: Masami Takanashi, Tokyo (JP)

(73) Assignee: HITACHI VANTARA, LTD., Yokohama (JP)

( * ) Notice: Subject to any disclaimer, the term of this patent is extended or adjusted under 35 U.S.C. 154(b) by 0 days.

(21) Appl. No.: 18/589,985

(22) Filed: Feb. 28, 2024

(65) Prior Publication Data

US 2024/0385752 A1    Nov. 21, 2024

(30) Foreign Application Priority Data

May 17, 2023   (JP) ................................ 2023-081804

(51) Int. Cl.
*G06F 3/06* (2006.01)
(52) U.S. Cl.
CPC .......... *G06F 3/0613* (2013.01); *G06F 3/0604* (2013.01); *G06F 3/0659* (2013.01); *G06F 3/067* (2013.01)

(58) Field of Classification Search
CPC ...... G06F 3/0604; G06F 3/061; G06F 3/0613; G06F 3/065; G06F 3/0653; G06F 3/0659; G06F 3/067
See application file for complete search history.

(56) References Cited

U.S. PATENT DOCUMENTS

2008/0077735 A1    3/2008   Kishi et al.

*Primary Examiner* — Yong J Choe
(74) *Attorney, Agent, or Firm* — Mattingly & Malur, PC

(57) ABSTRACT

The copy performance of a storage apparatus is improved. The storage apparatus includes a storage controller that processes an I/O request from a host, and a storage device that stores data from the host. For each of a plurality of volumes, the storage controller stores a schedule indicative of a copy speed level for each of continuous time slots in a cycle. The storage controller collects information regarding current performance of the storage controller, stores the collected current performance information into a memory, and determines the copy speed level for a next time slot on the basis of the copy speed level for the next time slot indicated by the schedule and a relation between a value indicated by the performance information and a threshold value.

9 Claims, 12 Drawing Sheets

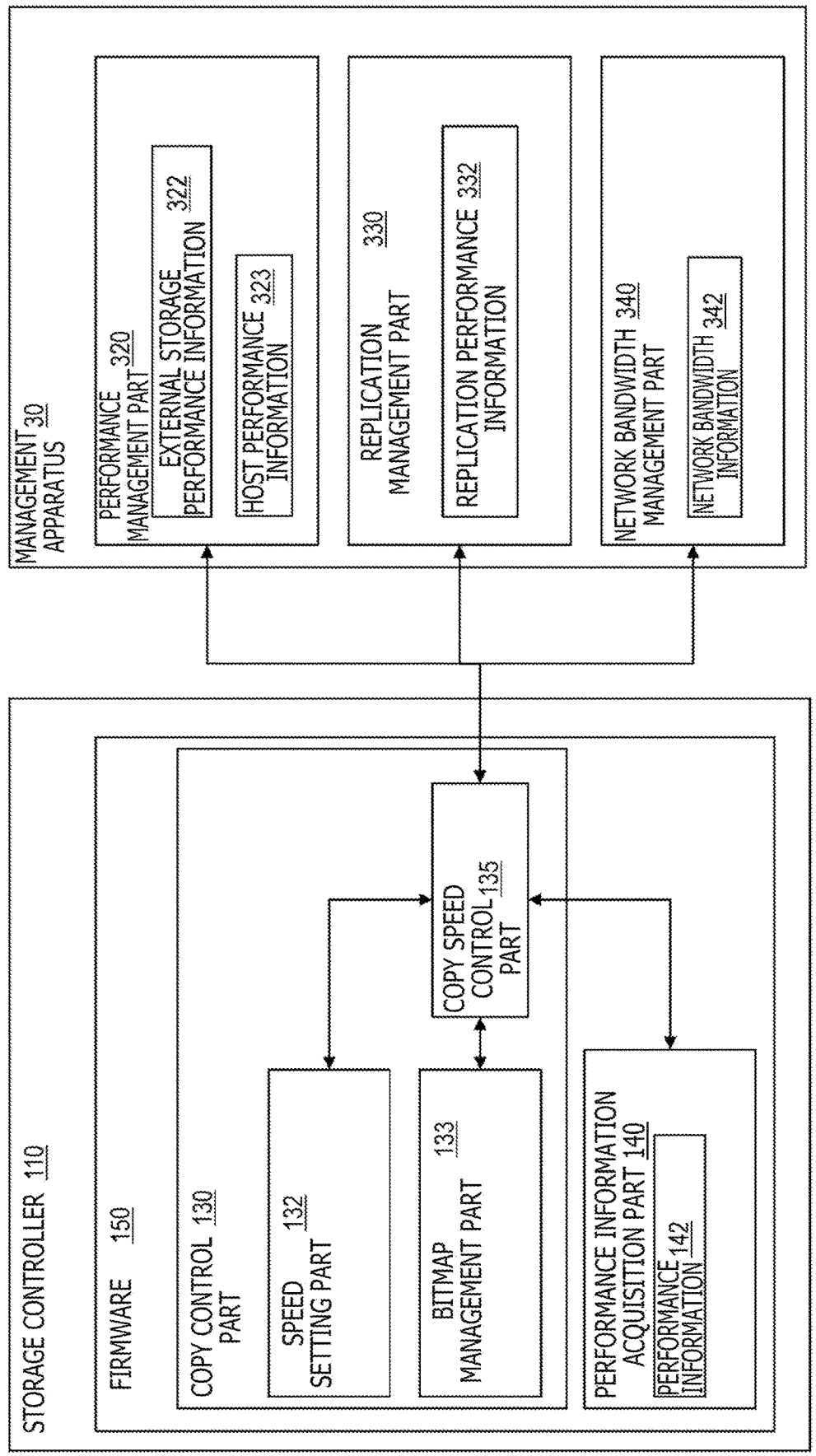

FIG.5

BITMAP MANAGEMENT TABLE (810)

| ADDRESS | 0000 | 0001 | 0010 | 0011 | ... |
|---|---|---|---|---|---|
| 0000 | 1 | 0 | 1 | 1 | ... |
| 0001 | 0 | 0 | 0 | 0 | ... |
| 0010 | 0 | 0 | 0 | 1 | ... |
| 0011 | 0 | 0 | 0 | 1 | ... |
| ... | ... | ... | ... | ... | ... |

FIG.6

USE FUNCTION MANAGEMENT TABLE (820)

| USE FUNCTION | FLAG |
|---|---|
| IN FIRMWARE | 000 |
| PERFORMANCE MANAGEMENT PART (T) ONLY | 001 |
| REPLICATION MANAGEMENT PART (R) ONLY | 010 |
| NETWORK BANDWIDTH MANAGEMENT PART (N) ONLY | 100 |
| PERFORMANCE MANAGEMENT PART (T) AND REPLICATION MANAGEMENT PART (R) | 011 |
| PERFORMANCE MANAGEMENT PART (T) AND NETWORK BANDWIDTH MANAGEMENT PART (N) | 101 |
| REPLICATION MANAGEMENT PART (R) AND NETWORK BANDWIDTH MANAGEMENT PART (N) | 110 |
| PERFORMANCE MANAGEMENT PART (T), REPLICATION MANAGEMENT PART (R), AND NETWORK BANDWIDTH MANAGEMENT PART (N) | 111 |

FIG.7

PERFORMANCE INFORMATION MANAGEMENT TABLE (830)

| DATA STORAGE DESTINATION (831) | DATA ITEM NAME (832) | IDEAL VALUE (FOR DAYS OTHER THAN PARTICULAR DAYS) (833) | IDEAL VALUE (FOR PARTICULAR DAYS) (834) | FLAG (835) | INSTANTANEOUS COUNT (836) |
|---|---|---|---|---|---|
| 00010010 | CACHE WRITE QUEUE RATE | 0000000000111100 | 0000000001011010 | 000 | 00000100 (837) |
| 00110001 | PROCESSOR OPERATION RATE | 0000000001011010 | 0000000001011010 | 001 | 00001000 (838) |
| 00001010 | PORT DATA TRAFFIC | 0000001101001000 | 0000001101001000 | 010 | 00000110 (839) |
| 00110011 | COPY PROCESS MULTIPLICITY | 0000000001000000 | 0000000001000000 | 000 | 00010100 (840) |
| ... | ... | ... | ... | ... | |

FIG.8

SPEED TABLE (845)

| SPEED (846) | IDENTIFIER (847) |
|---|---|
| LOW SPEED | 11111111 |
| MEDIUM SPEED | 00000000 |
| HIGH SPEED | 00000001 |

FIG.9

EXECUTION SPEED MANAGEMENT TABLE (850)

| DATE (851) | ITERATION (852) | SPEED (853) |
|---|---|---|
| 00001 | 0000000000000000 | 11111111 |
| ... | ... | |
| 11111 | 000000111100000 | 00000001 |

FIG.10

| DATE | INSTANTANEOUS COUNT | CHANGE COUNT | PARTICULAR DAY FLAG |
|---|---|---|---|
| 00001 | 00111100 | 00010100 | 0 |
| ... | ... | ... | ... |
| 11111 | 00001100 | 00101000 | 1 |

861 862 863 860 864

SPEED ADJUSTMENT COUNT AND
PARTICULAR DAY MANAGEMENT TABLE

FIG.11

| HIGH | LOW |
|---|---|
| 01010000 | 00011110 |

870 870 870

DEVIATION RATE MANAGEMENT TABLE

STORAGE APPARATUS

CLAIM OF PRIORITY

The present application claims priority from Japanese patent application JP 2023-081804 filed on May 17, 2023, the content of which is hereby incorporated by reference into this application.

BACKGROUND OF THE INVENTION

1. Field of the Invention

The present invention relates to a storage apparatus.

2. Description of the Related Art

As a background art of the present disclosure, there is U.S. Patent Application Publication No. 2008/0077735. U.S. Patent Application Publication No. 2008/0077735 discloses, as an example, "a cache disc storage including a plurality of disc drive subunits and a cache controller, the plurality of disc drive subunits being configured to store data and have a maximum capacity each, the total of the disc drive subunits including a maximum cache capacity, the cache controller being configured to support a requested upgrade adjustment of an available capacity of the cache disc storage, the cache controller further prescribing a capacity limit applicable to a file system offering an active perceived available capacity spanning the plurality of disc drive subunits, the perceived available capacity of each of the disc drive subunits being proportionate to the maximum capacity of the disc drive subunits in a manner similar to a relation between a total amount of active perceived available capacity of data storage provided by the file system in the cache disc storage and the maximum cache capacity, the capacity limit being associated with the requested upgrade adjustment in a manner causing the file system to control a data transfer speed."

SUMMARY OF THE INVENTION

Pieces of data from systems with diverse requirements can be present in a mixed manner in the storage apparatus. Storage designers are required to design volumes of storage in consideration of a variety of requirements, which complicates the design of storage apparatus performance. In order not to affect the performance of processing the access from hosts by the storage apparatus, the designers often set the speed of copy to a single low speed without designing the performance of copying volume data such as backups, or set a limited amount of dedicated cache logical partition (CLPR) for operation purposes. As a result, potential copying performance often remains not fully realized.

According to one embodiment of the present disclosure, there is provided a storage apparatus including a storage controller configured to process an input/output (I/O) request from a host, and a storage device configured to store data from the host. The storage controller stores, for each of a plurality of volumes, a schedule indicative of a copy speed level for each of continuous time slots in a cycle. The storage controller collects information regarding current performance of the storage controller and stores the collected current performance information into a memory. The storage controller determines the copy speed level for a next time slot indicated by the schedule, on the basis of the copy speed level for the next time slot and a relation between a value indicated by the performance information and a threshold value.

One embodiment of the present disclosure thus can improve the performance of copying volume data in the storage apparatus.

BRIEF DESCRIPTION OF THE DRAWINGS

FIG. 4 is a schematic view depicting an exemplary configuration of software executed by a storage controller and by the management apparatus;

FIG. 5 is a tabular view depicting an exemplary configuration of a bitmap management table;

FIG. 6 is a tabular view depicting an exemplary configuration of a use function management table;

FIG. 7 is a tabular view depicting an exemplary configuration of a performance information management table;

FIG. 8 is a tabular view depicting an exemplary configuration of a speed table;

FIG. 9 is a tabular view depicting an exemplary configuration of an execution speed management table;

FIG. 10 is a tabular view depicting an exemplary configuration of a speed adjustment count and particular day management table;

FIG. 11 is a tabular view depicting an exemplary configuration of a deviation rate management table;

DESCRIPTION OF THE PREFERRED EMBODIMENT

A preferred embodiment of the present invention is described below with reference to the accompanying drawings. It is to be noted that the embodiment is just one example of implementing the present invention and not limitative of the technical scope thereof and that not all the combinations of the features explained in connection with the embodiment are essential means for solving the problems of the present invention.

In the description that follows, various kinds of information may be explained using the expression "XXX table." However, such information may alternatively be expressed using data structures other than the tables. The expression "XXX table" can alternatively be referred to as "XXX information" in order to indicate that the information is not dependent on data structures. Further, although numerals will be used in the ensuing description as identification information to distinguish elements from each other, other kinds of identification information (such as names and identifiers (IDs)) may alternatively be used for the purpose.

Also in the ensuing description, in a case where elements of the same type are explained without being distinguished from each other, they may be represented by a common sign in reference signs (or reference signs). In a case where elements of the same type are explained as distinct from each other, each of the elements may be represented by a reference sign (or by an ID assigned to the element).

Programs are executed by a processor (e.g., a central processing unit (CPU)) in a storage controller to perform predetermined processes by using storage resources (e.g., main storage) and/or communication I/F devices as needed. For this reason, the storage controller or the processor may be considered to be the subject of the processing. Further, the storage controller may include hardware circuits that perform part or all of the processing. The computer programs may be installed from program sources. The program sources may be program distribution servers or computer-readable storage media, for example.

Figure 1:
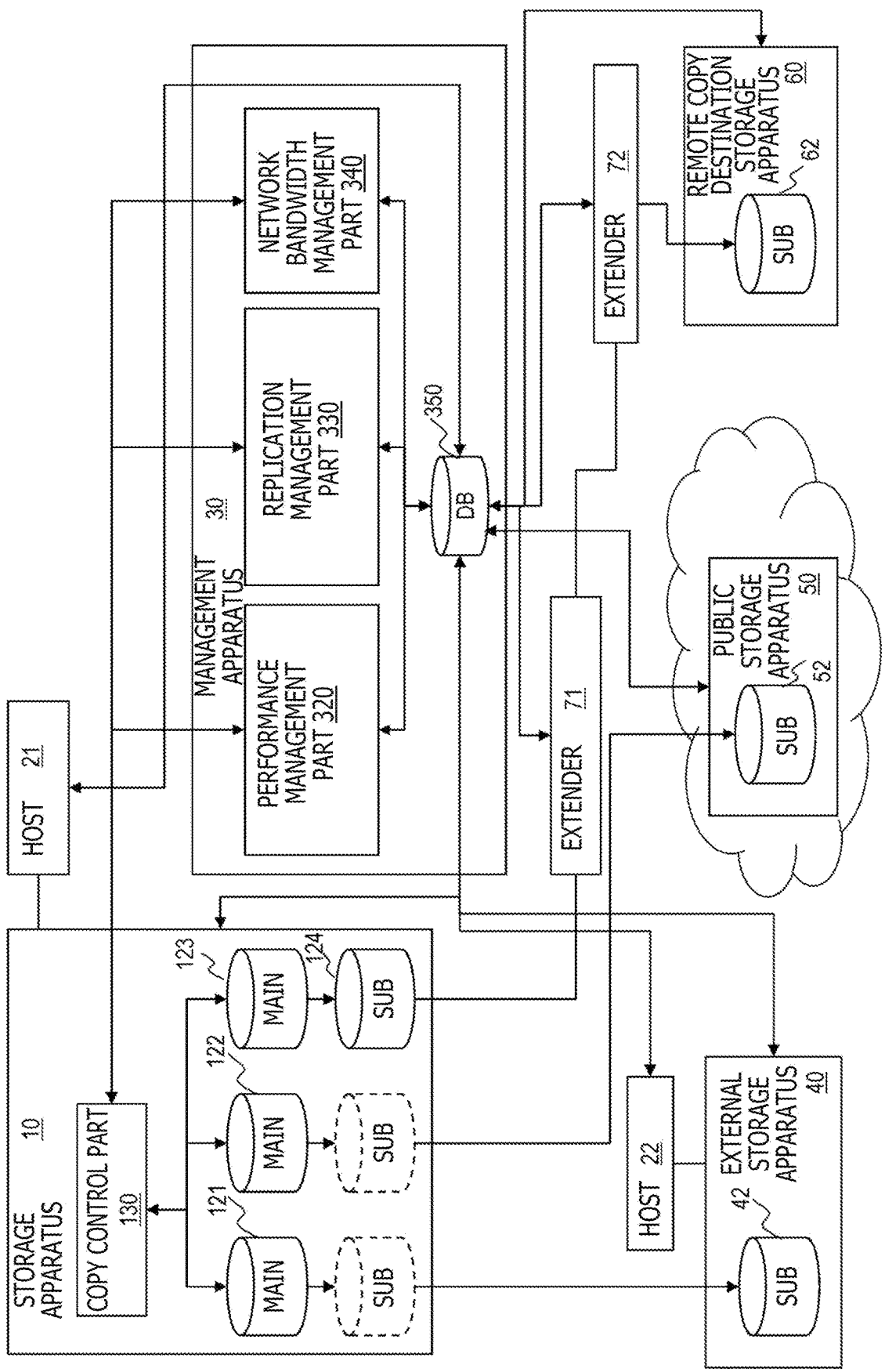
FIG. 1 is a schematic view depicting an exemplary configuration of a computer system as one embodiment of the present disclosure.

FIG. 1 schematically depicts an exemplary configuration of a computer system as one embodiment of the present disclosure. The computer system includes a storage apparatus 10, hosts 21 and 22, a management apparatus 30, an external storage apparatus 40, a public storage apparatus 50, and a remote copy (RC) destination storage apparatus 60. It is to be noted that as many apparatuses as desired may be provided, and some types of them may be omitted. The external storage apparatus 40, the public storage apparatus 50, and the remote copy destination storage apparatus 60 are a copy destination storage apparatus each.

The host 21 accesses volumes offered by the storage apparatus 10, via a storage area network, for example. The host 21 transmits, to the storage apparatus 10, an I/O request (a write request or a read request) designating the I/O destination. The host 22 accesses volumes offered by the external storage apparatus 40, via the storage area network, for example. The host 22 transmits, to the external storage apparatus 40, the I/O request designating the I/O destination.

The storage apparatus 10 copies as needed the data held in the volumes to a plurality of backup destinations. The copy for data backup (also simply referred to as backup) is either synchronous copy or asynchronous copy. The data to be copied may be the entire data from a copy source volume or difference data caused by update.

The backup within the storage apparatus 10 or the backup from the storage apparatus 10 to another storage apparatus is controlled by a copy control part 130. The copy control part 130 controls the copy speed on the basis of the information collected by the computer system. Further details in this respect will be discussed later. It is to be noted that, whereas the ensuing description will focus primarily on the data copy for backup, at least part of the features of the present disclosure can be applied to the data copy for purposes other than backup.

In the example of FIG. 1, the data in some main volumes of the storage apparatus 10 are copied to sub volumes of this storage apparatus 10 or of some other storage apparatus. The data in the main or sub volumes is stored into a physical storage device of the storage apparatus that manages these volumes.

In the example of FIG. 1, a sub volume 42 corresponding to a main volume 121 held in the storage apparatus 10 is stored in the external storage apparatus 40. The external storage apparatus 40 is an on-premise storage apparatus that communicates with the storage apparatus 10 via the storage area network, for example. The data in the main volume 121 of the storage apparatus 10 is copied to the sub volume 42 of the external storage apparatus 40 via a virtual volume in the storage apparatus 10.

A sub volume 52 corresponding to a main volume 122 held in the storage apparatus 10 is stored in the public storage apparatus 50. The public storage apparatus 50 is a storage apparatus that is present in a public cloud, for example. The storage apparatus 10 and the public storage apparatus 50 communicate with each other using a public Internet protocol (IP) network, for example.

A sub volume 124 copied from a main volume 123 held in the storage apparatus 10 is stored in the storage apparatus 10. Further, a sub volume 62 copied from the sub volume 124 serving as a main volume is stored in the remote copy destination storage apparatus 60. The data in the sub volume 62 can be used to restore the data in the main volume 123 at the time of disaster, for example.

The storage apparatus 10 and the remote copy destination storage apparatus 60 communicate with each other via a network path including extenders 71 and 72. The extenders 71 and 72 enable long-distance data transmission over the network while performing protocol conversion between the storage apparatuses 10 and 60 on one hand and the extenders 71 and 72 on the other hand. For example, dedicated lines may be used between the extenders, and the storage area network may be used between the extenders and the storage apparatuses.

The management apparatus 30 communicates with the storage apparatus 10, the external storage apparatus 40, the remote copy destination storage apparatus 60, the hosts 21 and 22, and the network extenders 71 and 72 via a management network. The management apparatus 30 collects various kinds of information from other apparatuses and stores the collected information into a database 350. In the example depicted in FIG. 1, a performance management part 320 collects performance information (load information) regarding the storage apparatus 10, the external storage apparatus 40, the remote copy destination storage apparatus 60, and the hosts 21 and 22 from the respective apparatuses and hosts.

It is to be noted that, if possible, the management apparatus 30 may communicate with the public storage apparatus 50 or with an apparatus that manages it in order to collect the performance information (load information) regarding the public storage apparatus 50.

A replication management part 330 collects remote copy-related performance information (load information) from the storage apparatus 10 as the remote copy source and from the remote copy destination storage apparatus 60. A network (NW) bandwidth management part 340 collects bandwidth information (communication load information) regarding the network used by the storage apparatus 10 for communication. In the example of FIG. 1, the bandwidth information is collected from the extenders 71 and 72. In addition, the network bandwidth management part 340 may collect the bandwidth information from the storage apparatus 10 and/or from a network apparatus between the storage apparatus 10 and the public storage apparatus 50.

It is to be noted that only part of the collection target information above may be collected and that the performance information regarding other apparatuses may also be collected. For example, the information regarding the hosts 21 and 22 may not be collected; only the information regarding the host 21 communicating with the storage apparatus 10 may be collected. In addition to or in place of the bandwidth information regarding the network, the bandwidth information regarding other networks may be collected. For example, the network bandwidth management part 340 may collect the bandwidth information from the storage apparatus 10, from the external storage apparatus 40, and/or from a network apparatus such as switches therebetween on the network. It is to be noted that collection of the performance information from the storage apparatus 10 may be omitted. The storage apparatus 10 holds and manages the information regarding the own apparatus.

Figure 2:
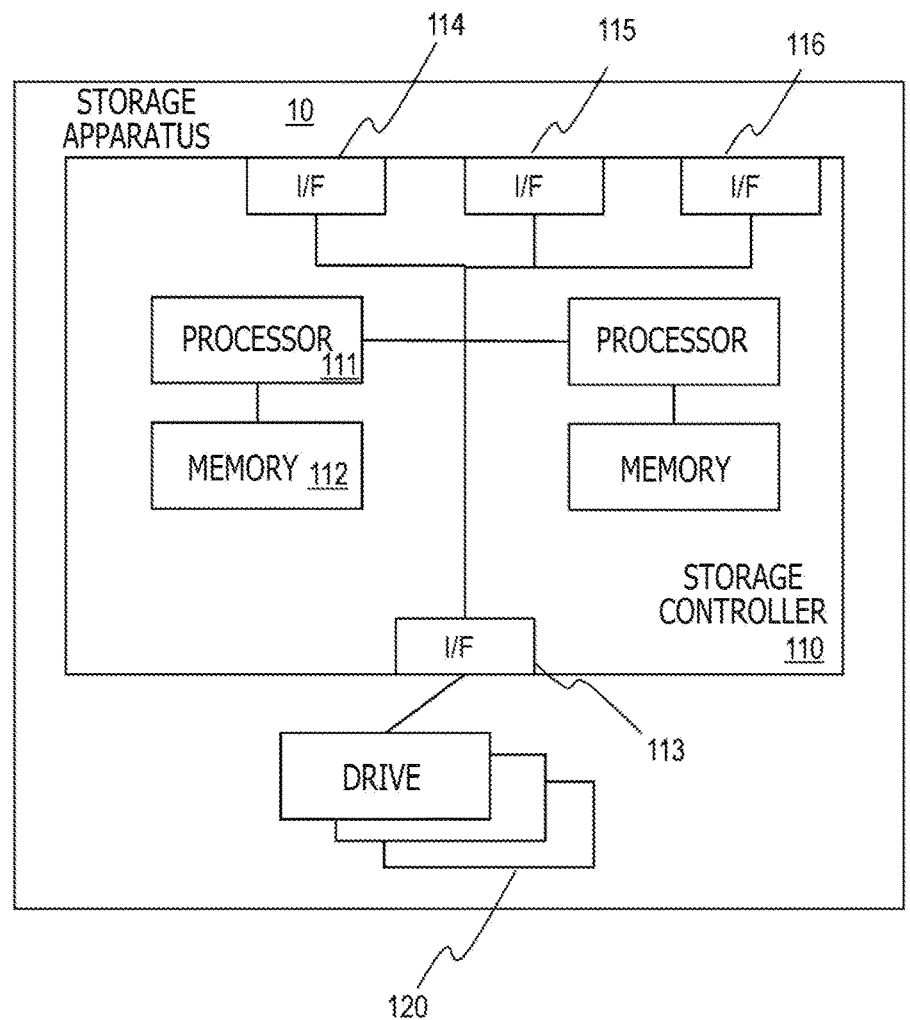
FIG. 2 is a schematic view depicting an exemplary hardware configuration of a storage apparatus.

FIG. 2 depicts an exemplary hardware configuration of the storage apparatus 10. The storage apparatus 10 includes one or more drives 120 as physical storage devices and a storage controller 110 connected with the drive(s) 120. The storage controller 110 includes I/Fs 113 through 116, a memory 112, and a processor 111 connected with the I/Fs 113 through 116 and with the memory 112. In FIG. 2, one of a plurality of processor and one of a plurality of memory are indicated by their reference signs as an example.

The I/F 114 is a communication I/F device that mediates data exchanges between the hosts and the storage controller 110. The I/F 114 is connected with the hosts via the storage area network, for example. The I/F 115 is an I/F device that communicates with the external storage apparatus 40 and the remote copy destination storage apparatus 60. The I/F 115 is connected with other storage apparatuses via the storage area network.

The I/F 116 is a communication I/F device that communicates with the management apparatus 30 and the public storage apparatus 50. The I/F 116 is connected with a local area network (LAN), for example. The I/F 116 communicates with the management apparatus 30 via the LAN or via both the LAN and a public carrier network. The I/F 116 communicates with the public storage apparatus 50 via the LAN and the public carrier network.

The I/F 113 is a communication I/F device that mediates data exchanges between the plurality of drives 120 on one hand and the storage controller 110 on the other hand. The I/F 113 is connected with the plurality of drives 120 via undepicted switches, for example.

The memory 112 stores programs to be executed by the processor 111 and the data to be used by the processor 111. The memory 112 is a random access memory (RAM) or a non-volatile RAM (NVRAM), for example. The programs and data held in an undepicted non-transitory storage medium are read into the memory 112.

The processor 111 performs the programs stored in the memory 112. For example, the memory 112 and the processor 111 are duplexed in pairs. The processor 111 includes a CPU, a micro processing unit (MPU), or a graphics processing unit (GPU), for example. Predetermined functions are implemented by the processor 111 reading and executing the suitable programs held in the memory 112.

The drives 120 are a hard disc drive (HDD) each, for example, and primarily store user data. Alternatively, the drives 120 may each be a semiconductor memory such as a flash memory. The plurality of drives 120 may constitute a redundant-arrays-of-inexpensive-disks (RAID) group. At least one logical storage region (volume) is created on the drives 120 on the basis of the RAID group. The volumes are associated with physical storage regions provided by the drives 120. It is to be noted that an explanation similar to what is given regarding the storage apparatus 10 can also apply to the hardware configuration of the other storage apparatuses 40, 50, and 60.

Figure 3:
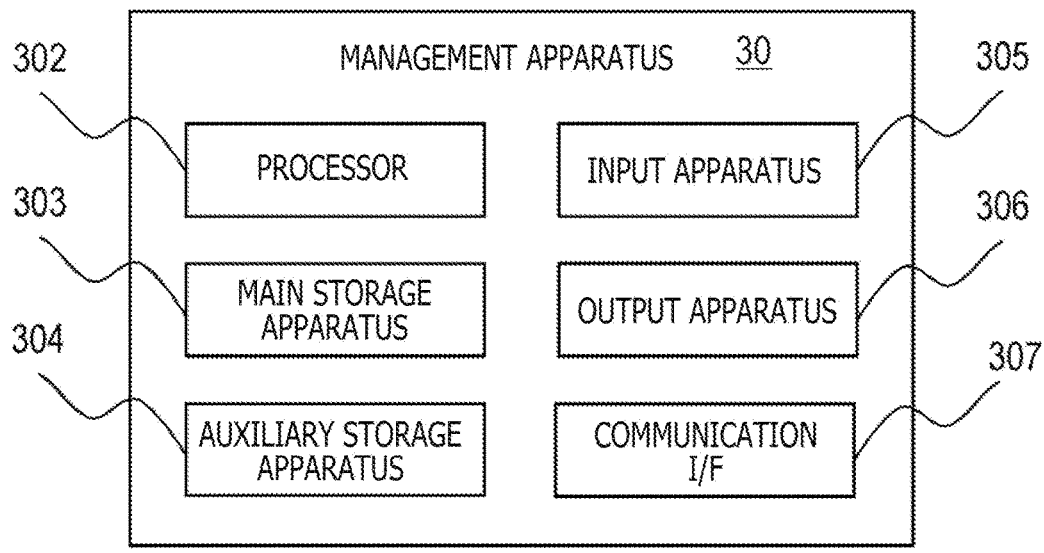
FIG. 3 is a schematic view depicting an exemplary hardware configuration of a management apparatus.

FIG. 3 depicts an exemplary hardware configuration of the management apparatus 30. The management apparatus 30 includes a processor 302, a main storage apparatus 303, an auxiliary storage apparatus 304, an input apparatus 305, an output apparatus 306, and a communication I/F 307. The components of the management apparatus 30 are communicably interconnected by way of communication means such as an undepicted bus. Alternatively, part or all of the configuration of the management apparatus 30 may be implemented by use of virtual resources such as cloud servers.

The processor 302 includes a CPU, an MPU, or a GPU, for example. Predetermined functions are implemented by the processor 302 reading and executing the programs held in the main storage apparatus 303. The main storage apparatus 303 stores programs and data and is a read-only memory (ROM), a RAM, or an NVRAM, for example.

The auxiliary storage apparatus 304 is a solid-state drive (SSD), an NVRAM, or an HDD, for example. The auxiliary storage apparatus 304 includes a non-transitory storage medium that stores programs and data. The programs and data held in the auxiliary storage apparatus 304 are read as needed into the main storage apparatus 303.

The input apparatus 305 is an I/F that receives input of information and is a keyboard, a mouse, a touch panel, a card reader, or a microphone, for example. The output apparatus 306 is an I/F that outputs various kinds of information and is a display apparatus, a printer apparatus, or an audio output apparatus such as speakers, for example. The communication I/F 307 is an apparatus used to communicate with other apparatuses by the management apparatus 30. The constituent elements depicted in FIG. 3 may be partially omitted or supplemented with other constituent elements.

FIG. 4 depicts an exemplary configuration of the software executed by the storage controller 110 and by the management apparatus 30. The software executed by the management apparatus 30 includes the performance management part 320, the replication management part 330, and the network bandwidth management part 340.

The performance management part 320 collects and manages performance information 322 regarding the external storage apparatus 40 and performance information 323 regarding the hosts 21 and 22. The performance management part 320 periodically collects the information from the external storage apparatus 40 and from the hosts 21 and 22, and causes the collected information to be included in the external storage performance information 322 and the host performance information 323. These sets of information are stored into the database 350. The external storage performance information 322 can include the same items as those of performance information 142 regarding the storage controller 110. The host performance information 323 is indicative of the performance of the hosts and can include a processor utilization rate and a memory utilization rate, for example. Further details of the items of the performance information 142 will be discussed later.

The replication management part 330 collects and manages remote copy-related performance information 332 regarding the storage apparatus 10 as the remote copy source and the storage apparatus 60 as the remote copy destination. The replication management part 330 periodically collects the information from the remote copy source storage apparatus 10 and from the remote copy destination storage apparatus 60, and causes the collected information to be included in the replication performance information 332. The replication performance information 332 is stored into the database 350.

The external storage performance information 322 and the replication performance information 332 can include processor operation rates, cache write queue rates, and port data traffic of the storage controller, for example. The cache write queue rate is the rate of the regions of the data waiting to be destaged to drives with respect to the cache regions. In a case where a plurality of storage controllers and a plurality of ports are provided, averages of their rates or values of predetermined devices may be used. It is to be noted that, if possible, the information regarding the remote copy destination storage apparatus 60 taken as an external storage may be included in the external storage performance information 322 of the performance management part 320.

The network bandwidth management part 340 collects the performance information regarding the network used by the storage apparatus 10, and causes the collected information to be included in network bandwidth information 342 for management purposes. The network bandwidth information 342 can be collected from network apparatuses such as the extenders 71 and 72, for example. The network bandwidth information 342 is stored into the database 350.

Firmware 150 to be executed by the storage controller 110 includes the copy control part 130 and a performance information acquisition part 140. The performance information acquisition part 140 collects current performance information 142 (load information) regarding the storage controller 110. For example, the performance information 142 can include processor operation rates, cache write queue rates, and backup job utilization rates. The backup job utilization rate is the rate of the number of execution processes with respect to a maximum number of backup processes that can be executed by the processors.

The performance information acquisition part 140 may further collect the bandwidth information regarding the network used by the storage controller 110. For example, the bandwidth information can include the port data traffic of the I/Fs 113 through 116. For example, the performance information 142 may be transferred to the management apparatus 30 and stored into the database 350. It is to be noted that the cycles in which to collect the current performance information regarding different functional parts may or may not be common therebetween.

The copy control part 130 includes a speed setting part 132, a bitmap management part 133, and a copy speed control part 135. The bitmap management part 133 provides bitmap management during volume copy. The speed setting part 132 sets the copy speed for each volume. It is to be noted that a plurality of volumes may be aggregated into one copy group and a common copy speed may be set for the volumes in the copy group. The copy speed control part 135 controls the copy speeds for individual volumes on the basis of computer system information collected by the management apparatus 30 and by the performance information acquisition part 140. Further details of the operation of the copy control part 130 will be discussed later.

What follows is an explanation of exemplary information held and managed by the storage controller 110. The information is stored in the memory 112. The management information of the storage controller 110 may also be stored in the drives 120 or in other non-volatile storage apparatuses.

FIG. 5 depicts an exemplary configuration of a bitmap management table 810. The bitmap management table 810 manages data differences between the copy source volumes on one hand and the copy destination volumes on the other hand. In the example of FIG. 5, the addresses in bitmap volumes are each represented by 8 bits. A column 811 indicates upper 4 bits, and a row 812 denotes lower 4 bits. In a case where the data at a given address differs between a copy source volume and a copy destination volume, the value of the address in question is 1 in the bitmap management table. In a case where the data at an address is the same between the two volumes, the address value is 0 in the bitmap management table.

FIG. 6 depicts an exemplary configuration of a use function management table 820. The use function management table 820 manages the flags for designating the range of the performance information to be referenced in copy control. The use function management table 820 includes a flag field 822 indicating the flags and a use function field 821 describing the functions represented by the flags and used for copy control. The copy control part 130 controls data copy by using the performance information collected by the functions described in the use function field 821.

For example, a flag 000 signifies the performance information collected by the firmware of the storage controller 110, i.e., by the performance information acquisition part 140 only. Flags 001, 010, and 100 signify, respectively, the performance information of the performance management part 320 only, the performance information of the replication management part 330 only, and the performance information of the network bandwidth management part 340 only. It is to be noted that, in the description that follows, a reference sign "T" may stand for the performance management part 320, a reference sign "R" for the replication management part 330, and a reference sign "N" for the network bandwidth management part 340 where appropriate.

FIG. 7 depicts an exemplary configuration of a performance information management table 830. The performance information management table 830 manages the information regarding the performance items to be referenced in copy control. The performance information management table 830 includes a data storage destination field 831, a data item name field 832, an ideal value field 833 for days other than particular days, an ideal value field 834 for particular days, a flag field 835, and an instantaneous count field 836.

A user sets an initial value for the ideal value for days other than particular days and an initial value for the ideal value for particular days of each of the records in the performance information management table 830. In an example, the initial value in the ideal value field 833 for days other than particular days and the initial value in the ideal value field 834 for particular days of each of the records are the same. The copy control part 130 updates the values in the ideal value field 833 for days other than particular days and the values in the ideal value field 834 for particular days. Further details of the update will be discussed later. In FIG. 7, each ideal value is represented by 16 bits.

It is to be noted that the ideal values for the performance items to be acquired by the performance management part 320, the replication management part 330, and the network bandwidth management part 340 may be set by the user with the performance management part 320, the replication management part 330, and the network bandwidth management part 340 and may be acquired into the performance information management table 830.

The data storage destination field 831 indicates the addresses in the memory 112 at which to store data. The data item name field 832 indicates the items of the performance information referenced in copy control. The ideal value field 833 for days other than particular days indicates the ideal values of the data items for days other than particular days. The ideal value field 834 for particular days indicates the ideal values of the data items for particular days. The ideal values are threshold values to be referenced in determining the copy speed level. The meaning of the flags indicated in the flag field 835 is similar to the meaning of the flags in the flag field 822 of the use function management table 820. The instantaneous count field 836 indicates the instantaneous counts per month. The initial value of the instantaneous count field 836 is 0. The instantaneous count denotes the number of times of lowering of the copy speed level in real time, and is updated during the copy process. Further details of the instantaneous counts will be discussed later.

Each of the records in the performance information management table 830 indicates the information of the data items in the data item name field 832, the information being among the performance information collected by the functions indicated by the flags in the flag field 835. For example, a value 000 in the flag field 835 of a record 837 points to the information collected by the performance information acquisition part 140 of the storage controller 110. The data item name field 832 indicates a cache write queue rate. Thus, the record 837 indicates information representing the cache write queue rate of the storage controller 110. Further details of the particular days and of the ideal values will be discussed later.

A value 001 in the flag field 835 of a record 838 points to the information collected by the performance management part 320 of the management apparatus 30. The data item name field 832 indicates a processor operation rate. As described above, the performance management part 320 collects and manages the external storage performance information 322 and the host performance information 323. Whereas the example in FIG. 7 defines common ideal values for both the external storage apparatus 40 and the hosts 21 and 22, the ideal values for the external storage apparatus 40 may be set to be different from those for the hosts 21 and 22. The ideal values for the hosts 21 and 22 may also be set to be either common or different therebetween.

A value 010 in the flag field 835 of a record 839 points to the information collected by the replication management part 330 of the management apparatus 30. The data item name field 832 indicates port data traffic. Thus, the record 839 indicates the ideal value of the data traffic per unit time of a specific port for remote copy by the storage apparatus 10. For example, this port data traffic may be the port data traffic of the remote copy destination storage apparatus 60 or an average of the data traffic per unit time of a plurality of ports.

A value 000 in the flag field 835 of a record 840 points to the information collected by the performance information acquisition part 140 of the storage controller 110. The data item name field 832 indicates copy process multiplicity. That is, what is indicated here is the ideal value of the copy process multiplicity of the storage controller 110. The greater the multiplicity of the copy process, the higher the copy speed.

FIG. 8 depicts an exemplary configuration of a speed table 845. The speed table 845 indicates the copy speeds that can be set by the copy control part 130. The copy speed is set for each of the volumes. It is to be noted that a plurality of volumes may be aggregated into a copy group and a common copy speed may be set for the volumes in the copy group.

The speed table 845 includes a speed field 846 and an identifier field 847. The example in FIG. 8 indicates three speed levels: low speed, medium speed, and high speed. The identifiers, each represented by 8 bits, define low speed as −1, medium speed as 0, and high speed as +1. It is to be noted that the speed table 845 indicates the copy speed levels that are different from actual copy speeds. The copy speed control part 135 determines an actual copy speed with respect to a designated copy speed level. For example, the copy speed varies with copy process multiplicity and is controlled in a manner finer than that of the speed levels.

FIG. 9 depicts an exemplary configuration of an execution speed management table 850. The execution speed management table 850 indicates a schedule of the copy speed levels set beforehand for each volume in a predetermined cycle (time slot), and a history of the actually selected copy speed levels. In an example, the predetermined cycle coincides with the cycle in which the performance information is acquired by the firmware 150. The storage controller 110 holds the execution speed management table 850 configured as indicated in FIG. 9 with respect to each volume or each copy group.

The execution speed management table 850 manages, for example, the information regarding the scheduled and actually selected copy speed levels of all iterations between the first day and the last day of a given month. The duration of the time slot of each iteration is fixed, for example, to three minutes. It is to be noted that backup copy is carried out in a limited time slot per day, for example. The schedule of the copy speed level for a given day as a backup cycle is determined at the end of the backup of the previous day, for example, and is registered to the execution speed management table 850.

The execution speed management table 850 includes a date field 851, an iteration field 852, and a speed field 853. The date field 851 indicates the days of a given month, each day being represented by 5 bits. The iteration field 852 indicates the iterations of each day, each iteration being represented by 16 bits. Before the start of the copy process, the initial value in the speed field 853 designates the copy speed level for each iteration (time slot). During execution of the copy process, the value in the speed field 853 is updated as needed to the copy speed level actually used in each iteration. As indicated by the speed table 845, the copy speed levels are represented by −1 for low speed, by 0 for medium speed, and by +1 for high speed. In the examples that follow, an initial value command either designates a specific copy speed or specifies that the initial value be the same copy speed level as that of the previous iteration.

As will be discussed later, the actual copy speed level for each volume in each time slot of the day is determined on the basis of the set speed level indicated in the speed field 853 and of the performance information acquired of the computer system. The value in the speed field 853 is updated with the actually used speed level.

FIG. 10 depicts an exemplary configuration of a speed adjustment count and particular day management table 860. The speed adjustment count and particular day management table 860 holds the number of times the speed has been changed for a given volume between the first day and the last day of a given month, in order to determine the particular days. In the example of FIG. 10, the speed adjustment count and particular day management table 860 includes a date field 861, an instantaneous count field 862, a change count field 863, and a particular day flag field 864.

The instantaneous count field 862 and the change count field 863 indicate the instantaneous count and the change count per day, respectively. These counts are updated as needed during the copy process of each day of the month. The instantaneous count and the change count will be discussed later. The value in the particular day flag field 864 of a given month is set before the start of the month. Further details in this respect will be discussed later in conjunction with a monthly process flow. In FIG. 10, the value of the flag indicating a particular day is 1. The speed adjustment count and particular day management table 860 is provided for each month and for each volume.

FIG. 11 depicts an exemplary configuration of a deviation rate management table 870. The deviation rate management table 870 holds the values set by the user for determining how much deviation from an ideal value is HIGH or LOW. The deviation rate management table 870 includes a HIGH field 871 and a LOW field 872. The HIGH field 871 indicates the threshold value for deviation from each ideal value, the threshold value serving to determine that the rate of deviation is HIGH. The LOW field 872 indicates the threshold value for deviation from each ideal value, the threshold value serving to determine that the rate of deviation is LOW.

What follows is an explanation of the process performed by the copy control part 130. In the example that follows, the copy control part 130 determines particular days and ordinary days other than the particular days on the basis of the result of the backup process of the month, as will be discussed later with reference to FIG. 14. The copy control part 130 further determines the initial values for the particular days and for the ordinary days in a copy speed level schedule. A corresponding copy speed level schedule is used for the first particular day and the first ordinary day of the month. This makes it possible to set an appropriate copy speed level for the particular days different from the ordinary days.

As will be discussed later with reference to FIG. 13, the copy control part 130 determines the copy speed level schedule for the second and subsequent particular days on the basis of the records of the previous particular day. The copy control part 130 further determines the copy speed level schedule for the second and subsequent ordinary days on the basis of the records of the previous ordinary day. For example, if a particular day is Tuesday, the copy speed level schedule for the second particular day is determined on the basis of the records of last Tuesday. The copy speed level schedule for Wednesday, which is an ordinary day, is determined on the basis of the records of Monday of the current week. In this manner, a more appropriate copy speed level schedule can be determined for each day.

As will be discussed later with reference to FIGS. 12A through 12D, the copy control part 130 determines the copy speed level for each time slot of a given day on the basis of a previously established schedule and the performance information collected of the computer system. This makes it possible to determine more appropriate copy speeds for the backup process of each day.

Explained first with reference to FIGS. 12A through 12D is an exemplary copy speed adjustment process in real time. In this example, the real-time speed adjustment process involves performing adjustment in such a manner that the copy speed stays equal to or less than an ideal value in a predetermined cycle, which may be the same as the cycle for performance information acquisition, for example. This reduces the effect of the copy process on other processes including a host I/O process.

In the example explained below, the real-time copy speed adjustment process is carried out in a predetermined cycle (e.g., at intervals of three minutes) during a specific period of the day. The copy speed level for each volume in each time slot is held in the speed field 853 of the execution speed management table 850. As discussed above, the commands specifically designate low speed, medium speed, or high speed.

In a case where a comparison between the previous time slot and the current time slot (current iteration) reveals a difference in the speed field 853, a command which changes the speed to the speed level in the speed field 853 for the current time slot (current iteration) is executed. If there is no difference in the speed field 853 as a result of the comparison between the previous time slot and the current time slot (current iteration), that means the current time slot is given the same copy speed level as the previous time slot. In this case, the speed level is not changed, i.e., no command is executed. The command to change the speed level is executed only when there is a difference in the speed field 853. This makes it possible to avoid unstable operations stemming from frequent ups and downs in the copy speed level. In the example explained below, the performance information 142 in the firmware 150 of the storage controller 110 is assumed to include cache write queue rates, processor operation rates, port data traffic, and backup job utilization rates.

First, the copy speed control part 135 compares the value of the latest cache write queue rate with the ideal value by referencing the performance information 142 and the performance information management table 830 (S11). The ideal values are indicated in the performance information management table 830. The ideal value here is selected depending on whether or not the day of interest is a particular day. The information regarding the particular days is indicated in the speed adjustment count and particular day management table 860. The cache write queue rate is a maximum value for, or an average value between, the cycles for performance information acquisition. In a case where the value of the cache write queue rate is higher than the ideal value, control of the process flow goes to the flowchart in FIG. 12B by way of combinator A.

The copy speed control part 135 compares the value of the latest processor operation rate with the ideal value by referencing the performance information 142 and the performance information management table 830 (S12). The ideal value here is selected depending on whether or not the day of interest is a particular day. The processor operation rate is a maximum value for, or an average value between, the cycles for performance information acquisition. In a case where the value of the processor operation rate is higher than the ideal value, control of the process flow goes to the flowchart in FIG. 12B by way of combinator A.

The copy speed control part 135 compares the value of the latest port data traffic with the ideal value by referencing the performance information 142 and the performance information management table 830 (S13). The ideal value here is selected depending on whether or not the day of interest is a particular day. The port data traffic is a maximum value for, or an average value between, the cycles for performance information acquisition. In a case where the value of the port data traffic is higher than the ideal value, control of the process flow goes to the flowchart in FIG. 12B by way of combinator A.

The copy speed control part 135 compares the value of the latest backup job utilization rate with the ideal value by referencing the performance information 142 and the performance information management table 830 (S14). The ideal value here is selected depending on whether or not the day of interest is a particular day. The backup job utilization rate is a maximum value for, or an average value between, the cycles for performance information acquisition. In a case where the value of the backup job utilization rate is higher than the ideal value, control of the process flow goes to the flowchart in FIG. 12B by way of combinator A.

In a case where all four values are equal to or less than the corresponding ideal values, the copy speed control part 135 assigns 0 to flags T, R, and N (S15). Here, the flags T, R and N correspond respectively to the performance management part 320, the replication management part 330, and the network bandwidth management part 340.

Next, the copy speed control part 135 determines whether or not there is linkage to the performance management part 320 by referencing the performance information management table 830 (S16). In a case where the flag field 835 indicates a value that includes the performance management part 320, there is linkage to the performance management part 320. In a case where there is linkage to the performance management part 320 ("YES" in S16), the copy speed control part 135 assigns 1 to the flag T and, in addition, copies, from the database 350, the information collected by the performance management part 320 (S17). In a case where there is no linkage to the performance management part 320 ("NO" in S16), step S17 is skipped.

Next, the copy speed control part 135 determines whether or not there is linkage to the replication management part 330 by referencing the performance information management table 830 (S18). In a case where the flag field 835 indicates a value that includes the replication management part 330, there is linkage to the replication management part 330. In a case where there is linkage to the replication management part 330 ("YES" in S18), the copy speed control part 135 assigns 1 to the flag R and, in addition, copies, from the database 350, the information collected by the replication management part 330 (S19). In a case where there is no linkage to the replication management part 330 ("NO" in S18), step S19 is skipped.

Next, the copy speed control part 135 determines whether or not there is linkage to the network bandwidth management part 340 by referencing the performance information management table 830 (S20). In a case where the flag field 835 indicates a value that includes the network bandwidth management part 340, there is linkage to the network bandwidth management part 340. In a case where there is linkage to the network bandwidth management part 340 ("YES" in S20), the copy speed control part 135 assigns 1 to the flag N and, in addition, copies, from the database 350, the information collected by the network bandwidth management part 340 (S21). In a case where there is no linkage to the network bandwidth management part 340 ("NO" in S20), step S21 is skipped.

Next, in a case where the flag T is 1, the copy speed control part 135 makes a comparison between each of the latest values of the data items designated by the performance information management table 830 on one hand and the corresponding ideal value on the other hand, by referencing the external storage performance information 322, the host performance information 323, and the performance information management table 830 (S22). In a case where the latest value of any one data item is higher than the ideal value, control of the process flow goes to the flowchart in FIG. 12B by way of combinator A. In a case where the latest values of all data items are equal to or less than the corresponding ideal values, control of the process flow goes to step S23.

Next, in a case where the flag R is 1, the copy speed control part 135 makes a comparison between each of the latest values of the data items designated by the performance information management table 830 on one hand and the corresponding ideal value on the other hand, by referencing the replication performance information 332 and the performance information management table 830 (S23). In a case where the latest value of any one data item is higher than the ideal value, control of the process flow goes to the flowchart in FIG. 12B by way of combinator A. In a case where the latest values of all data items are equal to or less than the corresponding ideal values, control of the process flow goes to step S24.

Next, in a case where the flag N is 1, the copy speed control part 135 makes a comparison between each of the latest values of the data items designated by the performance information management table 830 on one hand and the corresponding ideal value on the other hand, by referencing the network bandwidth information 342 and the performance information management table 830 (S24). In a case where the latest value of any one data item is higher than the ideal value, control of the process flow goes to the flowchart of FIG. 12B by way of combinator A. In a case where the latest values of all data items are equal to or less than the corresponding ideal values, control of the process flow goes to the flowchart of FIG. 12C by way of combinator B.

Figure 12A:
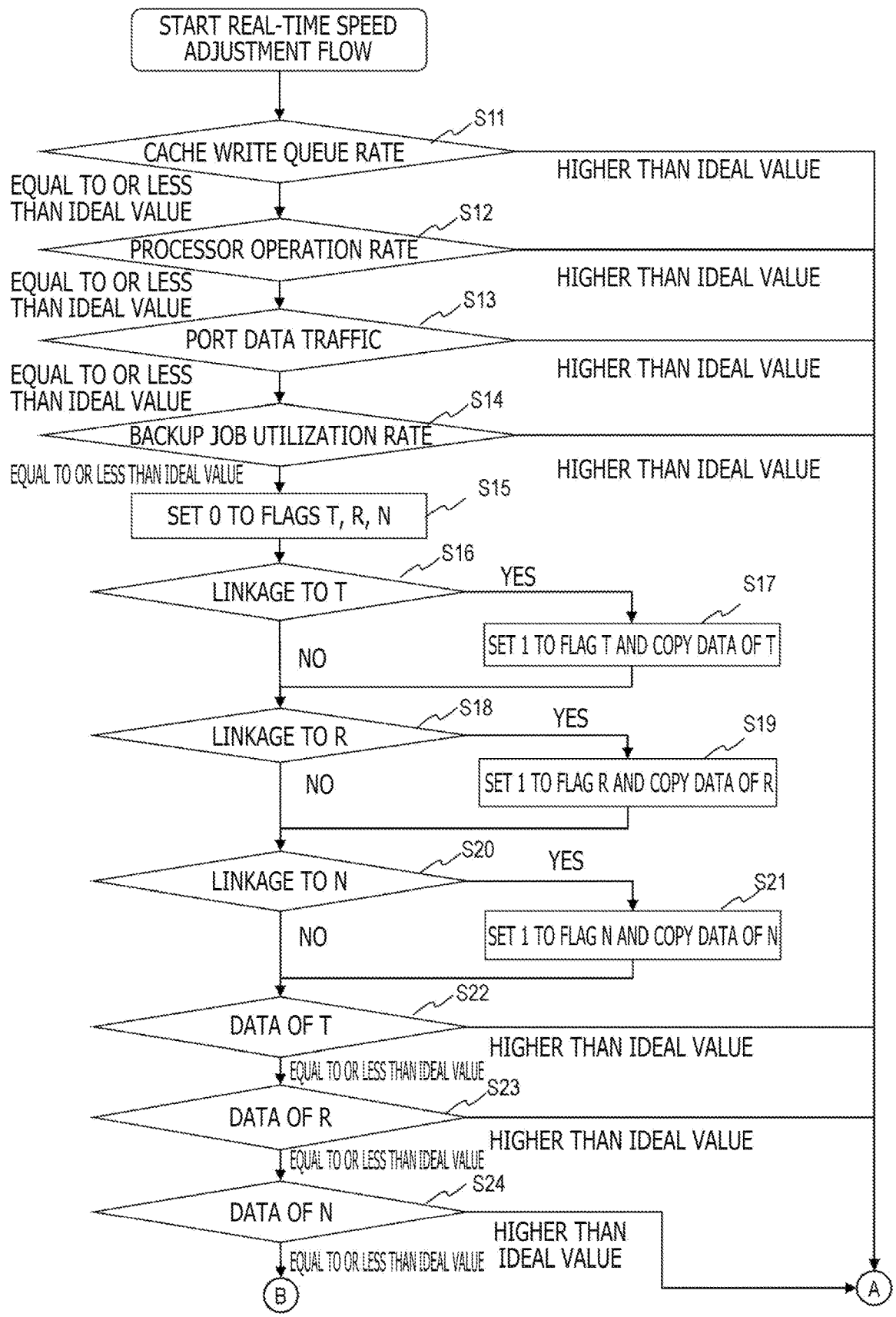
FIG. 12A is a flowchart of a processing example of real-time copy speed adjustment.
Figure 12B:
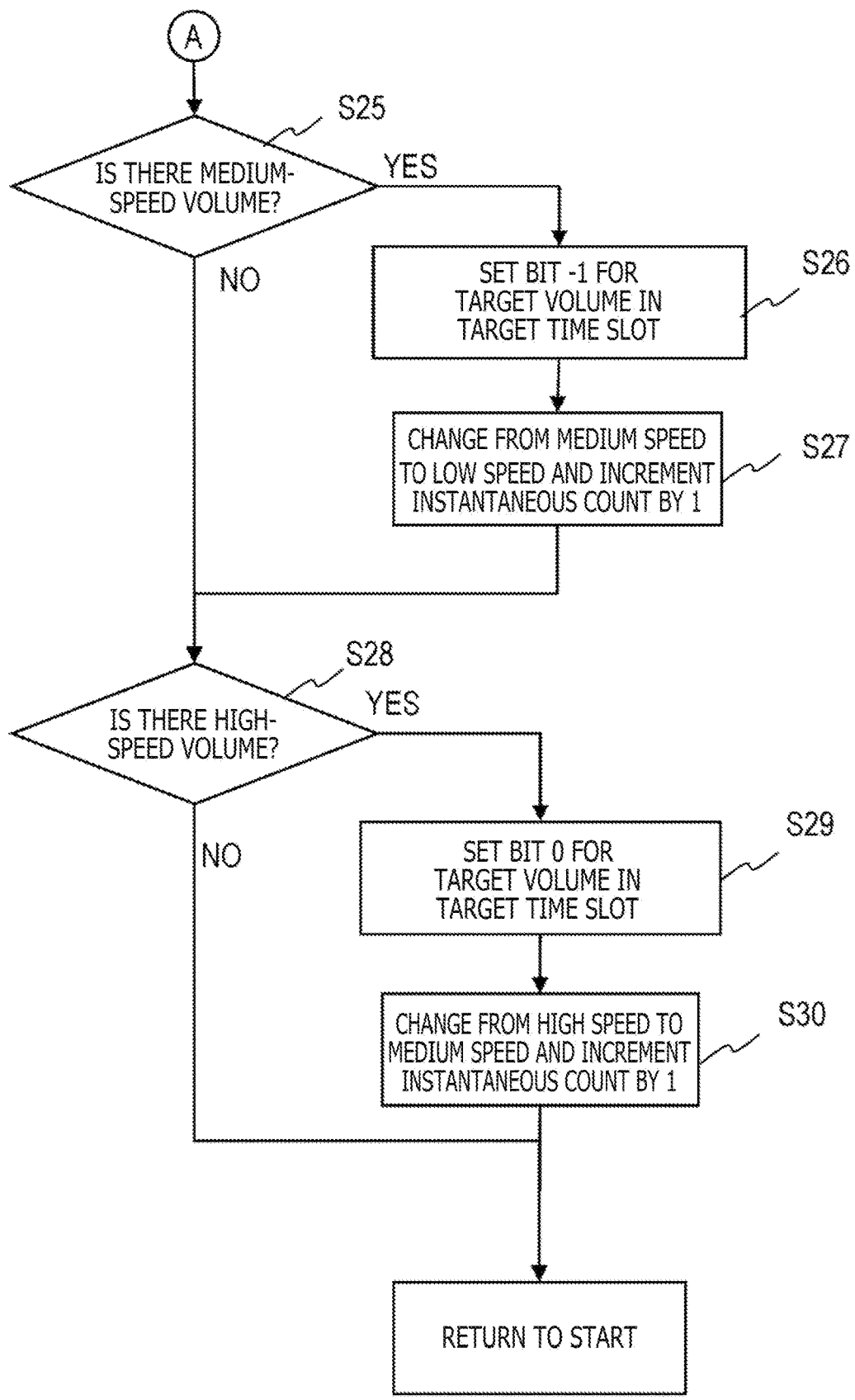
FIG. 12B is another flowchart of the processing example of real-time copy speed adjustment.

The flowchart of FIG. 12B is explained next. The copy speed control part 135 starts the process of the flowchart in FIG. 12B by way of combinator A. First, the copy speed control part 135 determines whether there is any volume for which the copy speed level is set to medium speed in the current time slot (current iteration), by referencing the execution speed management table 850 (S25).

In a case where there is a medium-speed volume ("YES" in S25), the copy speed control part 135 sets a bit-1 for the target volume in the current time slot (target time slot) (S26). The bit information regarding each time slot and each volume is written to an undepicted table in the memory 112. The copy speed control part 135 changes the copy speed level set for the target volume from medium speed to low speed. The copy speed control part 135 then increments the value in the instantaneous count field 862 of the speed adjustment count and particular day management table 860 as well as the value in the instantaneous count field 836 of the corresponding data item in the performance information management table 830 (S27).

Next, the copy speed control part 135 determines whether there is any volume for which the copy speed level is set to high speed in the current time slot (current iteration), by referencing the execution speed management table 850 (S28). In a case where there is a high-speed volume ("YES" in S28), the copy speed control part 135 sets a bit 0 for the target volume in the current time slot (target time slot) (S29). The copy speed control part 135 changes the copy speed level set for the target volume from high speed to medium speed. The copy speed control part 135 then increments the value in the instantaneous count field 862 of the speed adjustment count and particular day management table 860 as well as the value in the instantaneous count field 836 of the corresponding data item in the performance information management table 830 (S30).

Figure 12C:
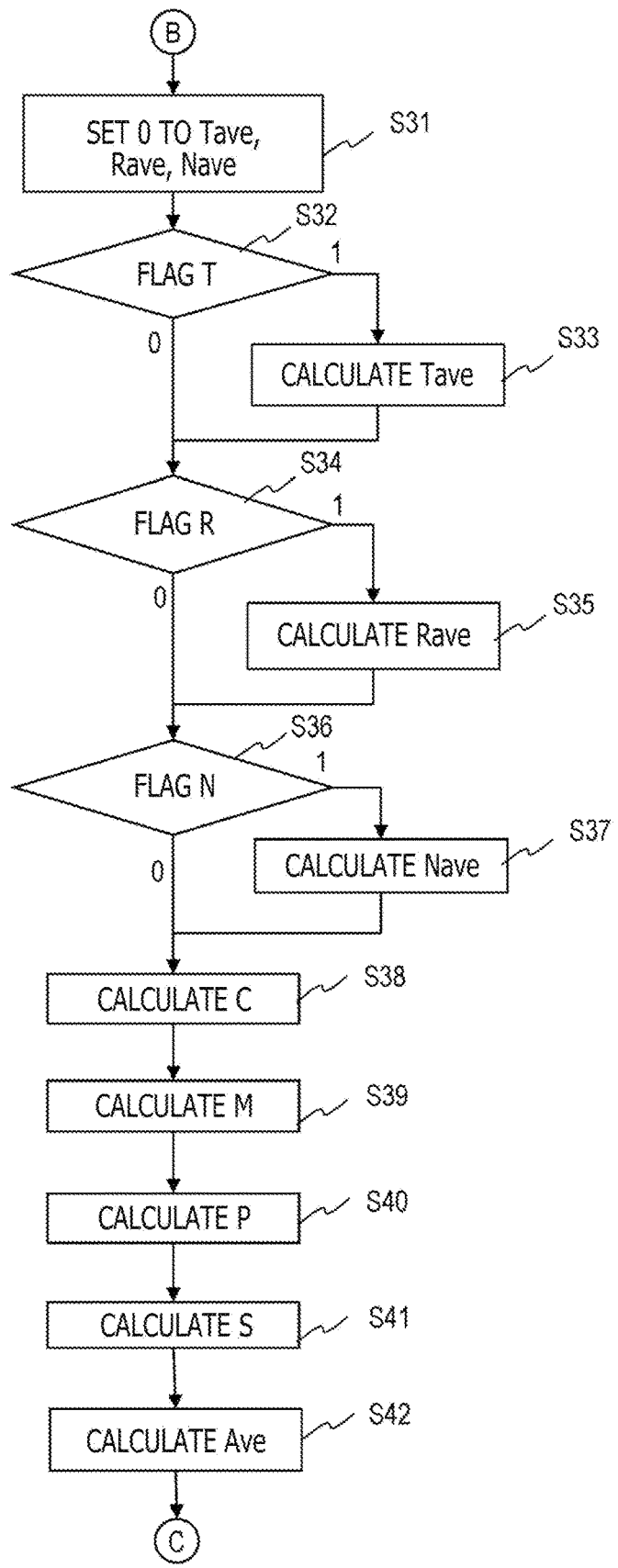
FIG. 12C is still another flowchart of the processing example of real-time copy speed adjustment.

The flowchart of FIG. 12C is explained next. The copy speed control part 135 starts the process of the flowchart in FIG. 12C by way of combinator B. The process indicated in FIG. 12C involves calculating the rates of deviation from ideal values.

The copy speed control part 135 assigns 0 to variables Tave, Rave, and Nave (S31). The variable Tave is an average value of the rates of deviation from the ideal values of the data items for the performance management part 320. The variable Rave is an average value of the rates of deviation from the ideal values of the data items for the replication management part 330. The variable Nave is an average value of the rates of deviation from the ideal values of the data items for the network bandwidth management part 340.

Next, the copy speed control part 135 determines the value of the flag T (S32). In a case where the value of the flag T is 1 ("1" in S32), the copy speed control part 135 calculates the value of Tave (S33). For example, the calculation formula here is: (data copy of T/ideal value)*100/ (number of data items of T). That is, the sum of the rates of the values of all data items for the performance management part 320 with regard to the respective ideal values is calculated, the sum being divided thereafter by the number of the data items. In a case where the value of the flag T is 0 ("0" in step S32), step S33 is skipped.

Next, the copy speed control part 135 determines the value of the flag R (S34). In a case where the value of the flag R is 1 ("1" in S34), the copy speed control part 135 calculates the value of Rave (S35). For example, the calculation formula here is: (data copy of R/ideal value)*100/ (number of data items of R). That is, the sum of the rates of the values of all data items for the replication management part 330 with regard to the respective ideal values is calculated, the sum being divided thereafter by the number of the data items. In a case where the value of the flag R is 0 ("0" in step S34), step S35 is skipped.

Next, the copy speed control part 135 determines the value of the flag N (S36). In a case where the value of the flag N is 1 ("1" in S36), the copy speed control part 135 calculates the value of Nave (S37). For example, the calculation formula here is: (data copy of N/ideal value)*100/ (number of data items of N). That is, the sum of the rates of the values of all data items for the network bandwidth management part 340 with regard to the respective ideal values is calculated, the sum being divided thereafter by the number of the data items. In a case where the value of the flag N is 0 ("0" in step S36), step S37 is skipped.

Next, the copy speed control part 135 calculates the rate of deviation C from the ideal value of the cache write queue rate for the storage controller 110 (S38). For example, the calculation formula here is: (cache write queue rate/ideal value)*100.

Next, the copy speed control part 135 calculates the rate of deviation M from the ideal value of the processor operation rate for the storage controller 110 (S39). For example, the calculation formula here is: (processor operation rate/ ideal value)*100.

Next, the copy speed control part 135 calculates the rate of deviation P from the ideal value of the port data traffic for the storage controller 110 (S40). For example, the calculation formula here is: (port data traffic/ideal value)*100.

Next, the copy speed control part 135 calculates the rate of deviation S from the ideal value of the backup job utilization rate for the storage controller 110 (S41). For example, the calculation formula here is: (backup job utilization rate/ideal value)*100.

Next, the copy speed control part 135 calculates an average value Ave of the values Tave, Rave, Nave, C, M, P, and S calculated so far (S42). Thereafter, control of the process flow goes to the flowchart of FIG. 12D by way of combinator C.

Figure 12D:
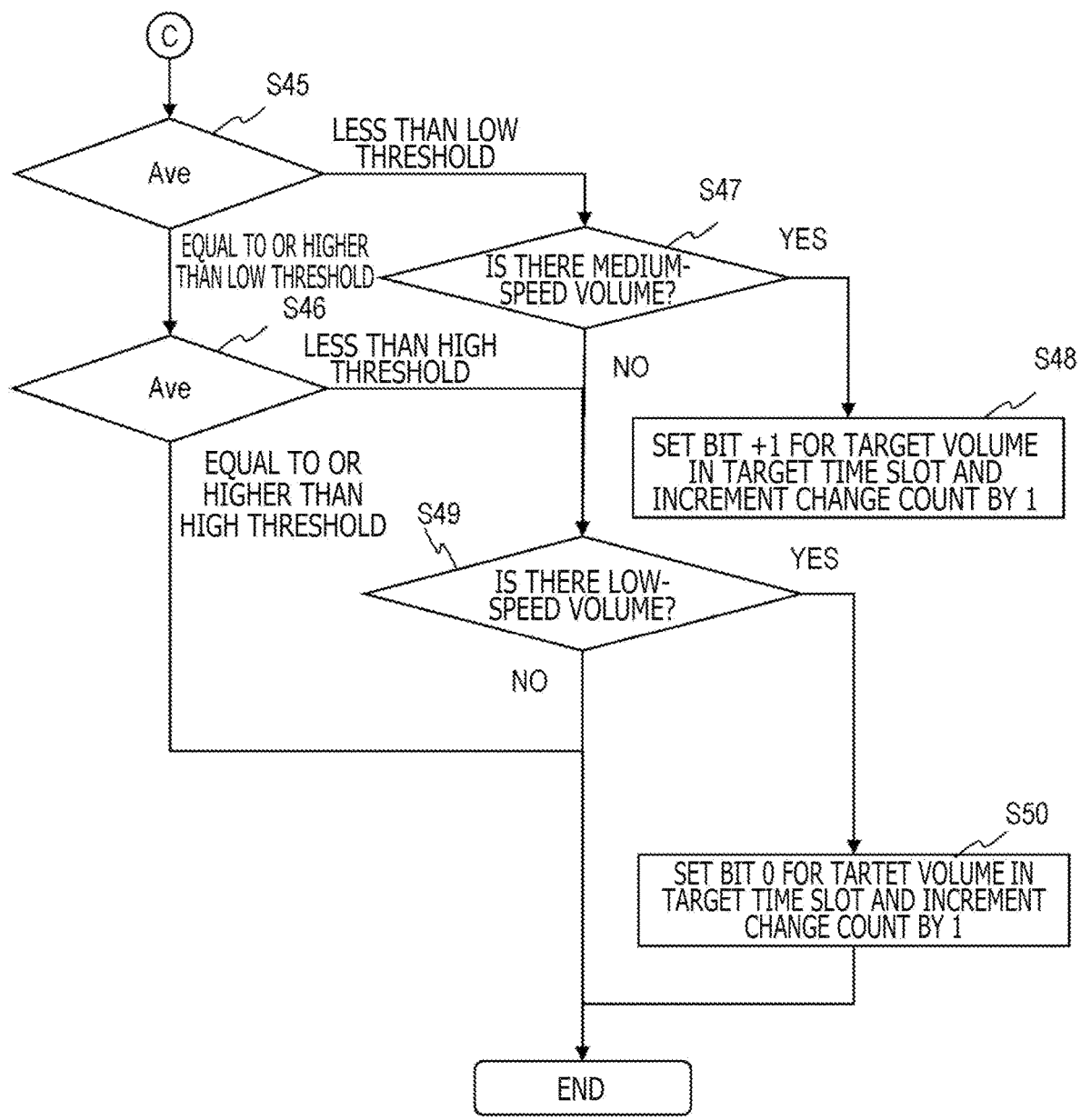
FIG. 12D is yet another flowchart of the processing example of real-time copy speed adjustment.

The flowchart of FIG. 12D is explained next. The copy speed control part 135 starts the process of the flowchart in FIG. 12D by way of combinator C. The process in FIG. 12D involves determining whether to increment by one level the copy speed for the same time slot (the same iteration) of the next day in a case where the copy speed level set for the current time slot (current iteration) has a margin of tolerance with respect to the ideal value. It is to be noted that the next day here refers to the next ordinary day if the current day is an ordinary day other than the particular days, or the next particular day if the current day is a particular day.

The copy speed control part 135 makes a comparison between the value of the average deviation rate Ave calculated in step S42 in FIG. 12C on one hand and a threshold value LOW on the other hand (S45). The threshold value LOW is registered in the deviation rate management table 870.

In a case where the value of the average deviation rate Ave is equal to or higher than the threshold value LOW, the copy speed control part 135 makes a comparison between the average deviation rate Ave and a threshold value HIGH (S46). The threshold value HIGH is registered in the deviation rate management table 870. In a case where the value of the average deviation rate Ave is equal to or higher than the threshold value HIGH, this process is terminated.

In a case where the value of the average deviation rate Ave is less than the threshold value HIGH in step S45, the copy speed control part 135 determines whether there is any volume for which the copy speed level is set to medium speed (S47). In a case where there is a volume for which the copy speed level is set to medium speed, a bit +1 is set for the target volume and for the current time slot (target time slot), and the value in the change count field 863 of the speed adjustment count and particular day management table 860 is incremented (S48).

In a case where there is no volume for which the copy speed level is set to medium speed in step S47, or in a case where the value of the average deviation rate Ave is less than the threshold value HIGH in step S46, the copy speed control part 135 determines whether there is any volume for which the copy speed level is set to low speed (S49).

In a case where there is a volume for which the copy speed level is set to low speed, a bit 0 is set for the target volume and for the current time slot (target time slot), the value of the change count field 863 in the speed adjustment count and particular day management table 860 is incremented (S50), and this process is terminated. In a case where there is no volume for which the copy speed level is set to low speed, this process is also terminated.

During the process explained above with reference to FIGS. 12A through 12D, the copy speed control part 135 writes, to the execution speed management table 850, the information regarding the copy speed levels actually used for each volume in each time slot.

During the process explained above with reference to FIGS. 12A through 12D, the copy speed control part 135 determines the copy speed level for the next time slot on the basis of the copy speed level for the next time slot indicated in the execution speed management table 850 and the relation between the value indicated by the performance information of the computer system on one hand and the ideal value on the other hand. The copy speed control part 135 determines the need to maintain, to increase, or to lower the speed level. Given the need to maintain or increase the speed level, the copy speed control part 135 determines maintaining of the copy speed level for the next time slot as depicted in FIG. 12D. Given the need to lower the speed level, the copy speed control part 135 determines lowering of the copy speed level for the next time slot as indicated in FIG. 12B.

In a case where the system load is higher than a set level relative to an ideal value, the copy speed level is instantaneously lowered. This reduces the effect on other processes. Further, if the system load is lower than the set level with respect to the ideal value, the copy speed level is not increased instantaneously; only the relation between the system load and the set level is recorded. This makes it possible to avoid unstable operations stemming from frequent ups and downs in the copy speed level. It is to be noted that the copy speed level may be instantaneously increased. Further, the copy speed level may not be lowered instantaneously.

The process of preparing a backup execution plan is explained next. The backup execution plan is carried out in a given predetermined cycle. The process involves aggregating the data over a predetermined period at the end of a regular backup and determining a backup execution plan for each volume over the next predetermined period. The execution plan involves determining the copy speed for each volume in each time slot and registering the determined copy speeds to the execution speed management table 850. The process explained above with reference to FIGS. 12A through 12D is carried out repeatedly in the cycle at which the backup execution plan is prepared. For example, the backup execution plan is performed every day (every 24 hours), and the real-time speed adjustment explained with reference to FIGS. 12A through 12D is carried out every three minutes.

Figure 13:
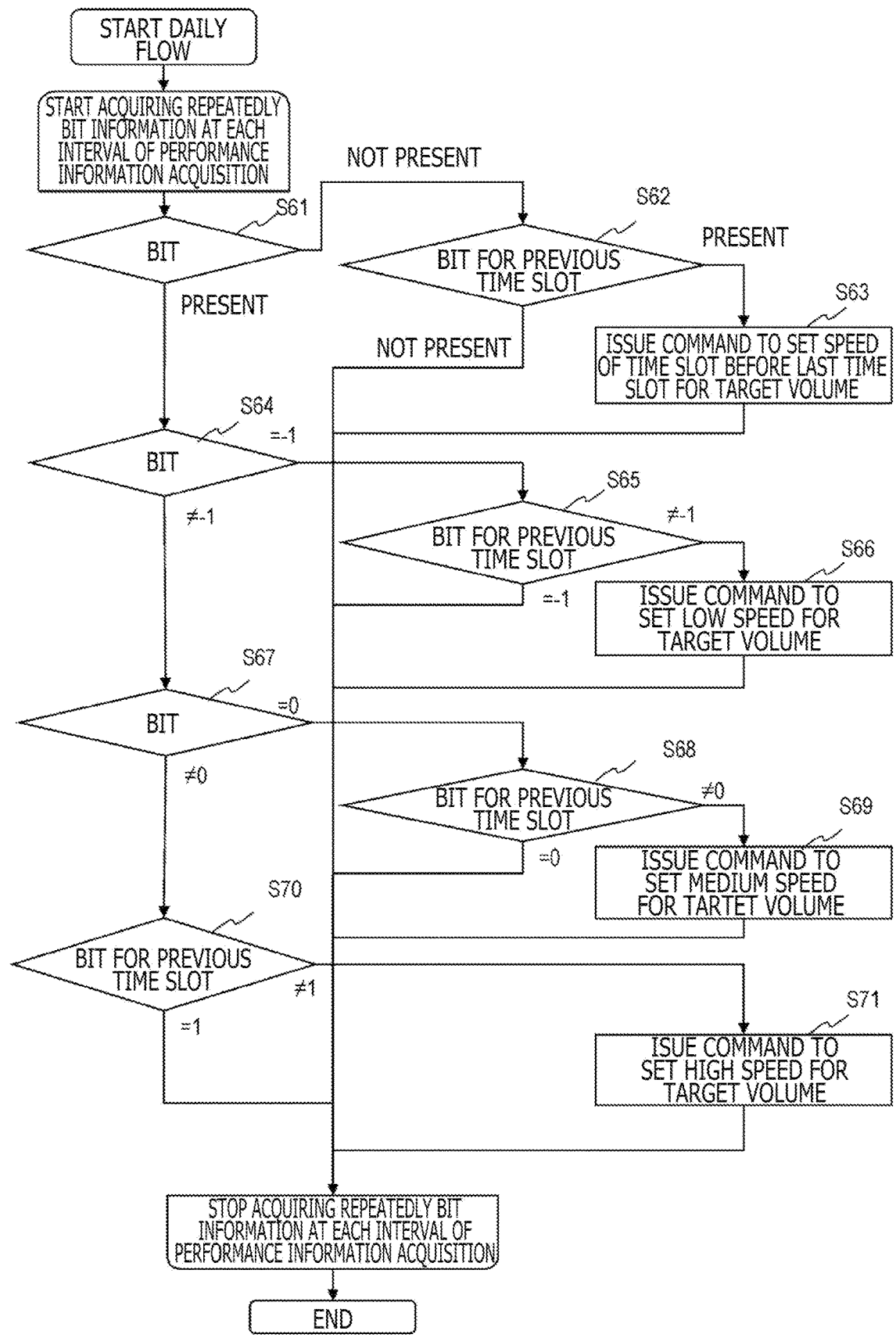
FIG. 13 is a flowchart of a processing example of next-day backup execution plan preparation.

FIG. 13 is a flowchart of a processing example of next-day backup execution plan preparation. The backup execution plan refers to a daily schedule of copy speed levels for each volume. To prepare the copy speed level schedule for a particular day, the speed setting part 132 references the records of the previous particular day. Further, to prepare the copy speed level schedule for an ordinary day other than the particular days, the speed setting part 132 references the records of the previous ordinary day. With respect to each volume, the speed setting part 132 acquires repeatedly the bit information at each interval of performance information acquisition during the process explained above with reference to FIGS. 12A through 12D, and carries out the process described below. The schedule of copy speed levels for the first day (the first particular day and the first ordinary day) of the month will be discussed later with reference to FIG. 14.

The speed setting part 132 determines whether there is a bit for the time slot of interest (S61). In a case where there is no such bit, the speed setting part 132 determines whether there is a bit for the previous time slot (S62). In a case where there is no such bit for the previous time slot, this process is terminated. In a case where there is a bit for the previous time slot, the speed setting part 132 sets the same speed level as the copy speed level in the time slot before the last time slot, the copy speed level being set for the target volume in the execution speed management table 850, to the time slot of interest on the next day in the execution speed management table 850 (S63). It is to be noted that, in a case where the current day is an ordinary day other than the particular days, the next day here means the next ordinary day; in a case where the current day is a particular day, the next day means the next particular day.

In a case where there is a bit in step S61, the speed setting part 132 determines whether the value indicated by the bit is −1 (S64). In a case where the value indicated by the bit is −1, the speed setting part 132 determines the value of the bit for the previous time slot (S65). In a case where the value of the bit for the previous time slot is −1, this process is terminated. In a case where the value of the bit for the previous time slot is other than −1, the speed setting part 132 sets, to low speed, the speed level for the target volume in the time slot of interest of the next day in the execution speed management table 850 (S66).

In a case where the value indicated by the bit is other than −1 in step S64, the speed setting part 132 determines whether the value indicated by the bit is 0 (S67). In a case where the value indicated by the bit is 0, the speed setting part 132 determines the value of the bit for the previous time slot (S68). In a case where the value of the bit for the previous time slot is 0, this process is terminated. In a case where the value of the bit for the previous time slot is other than 0, the speed setting part 132 sets, to medium speed, the speed level for the target volume in the time slot of interest of the next day in the execution speed management table 850 (S69).

In a case where the value indicated by the bit is other than 0 in step S67, the speed setting part 132 determines whether the value indicated by the bit for the previous time slot is 1 (S70). In a case where the value indicated by the bit for the previous time slot is other than 1, the speed setting part 132 sets, to high speed, the speed level for the target volume in the time slot of interest of the next day in the execution speed management table 850 (S71). In a case where the value indicated by the bit for the previous time slot is 1, this process is terminated.

The processing described above makes it possible to appropriately determine the copy speed level schedule for the next day in keeping with the status of the computer system, on the basis of the relation between the ideal values in the copy process on the previous day on one hand and the performance information on the other hand and the bit indicative of the relations between that relation on one hand and the copy speed levels set for the volumes on the other hand. Also, the bit management enables avoiding unstable operations stemming from frequent ups and downs in the copy speed level.

Figure 14:
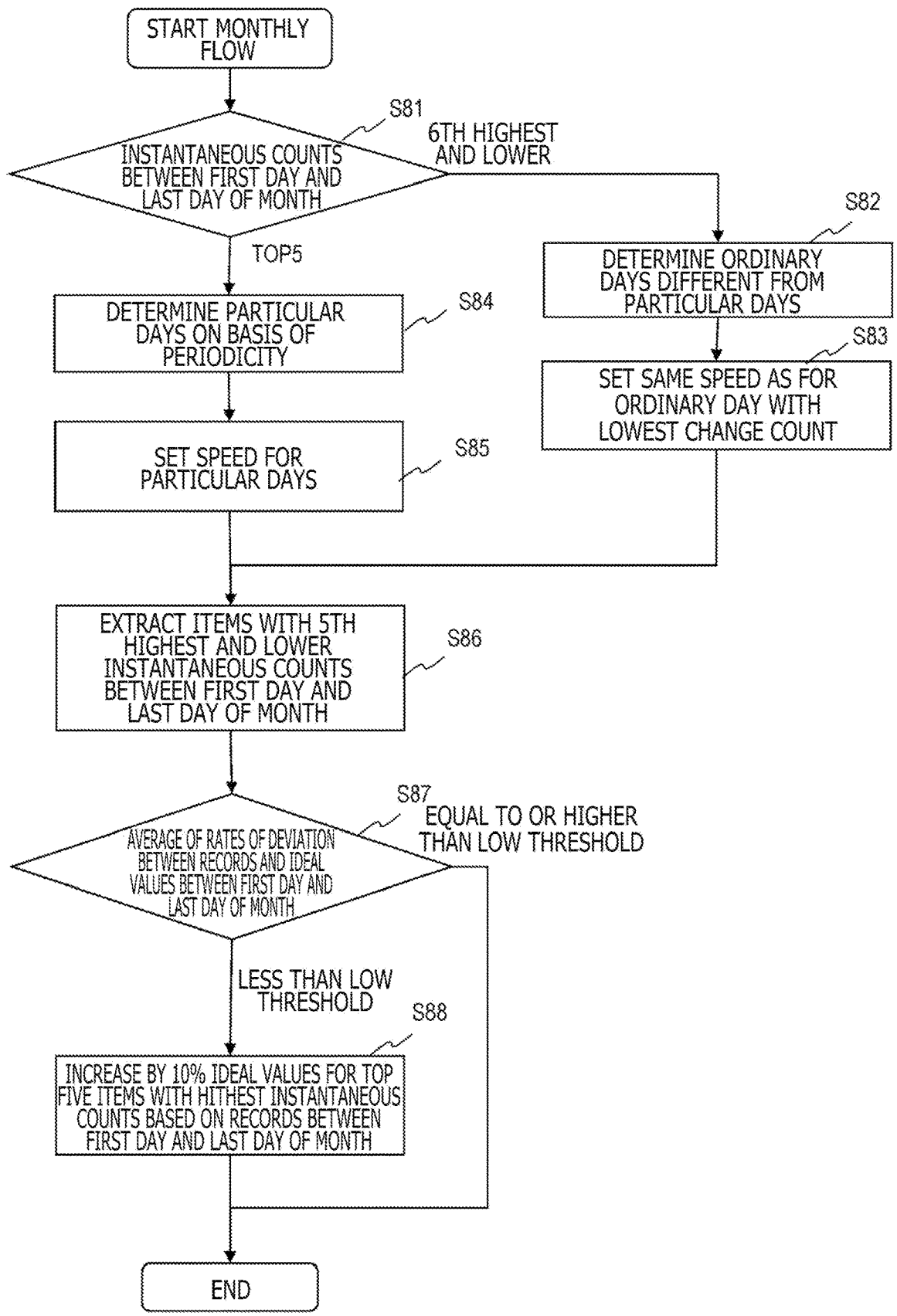
FIG. 14 is a flowchart of a processing example of particular day determination and ideal value adjustment.

Explained next with reference to the flowchart of FIG. 14 is the process of particular day determination and ideal value adjustment. For example, this process may be a monthly flow carried out every month. The monthly flow may involve, for example, aggregating the data between the first day and the last day of every month, determining the particular days, and adjusting the ideal values.

The speed setting part 132 acquires the information of the instantaneous counts between the first day and the last day of the previous month from the speed adjustment count and particular day management table 860. Here, the instantaneous counts per day for all volumes are acquired. The speed setting part 132 further determines a predetermined number of the days with the highest instantaneous counts and the other days (S81). Here, the top five days with the highest instantaneous counts are separated from the other days. The instantaneous count is incremented when the copy speed level is lowered according to the relation between the performance information and the ideal value. High instantaneous counts signify that the copy speed level is frequently lowered from the previous set value. This makes it possible to appropriately determine the particular days. It is to be noted that any day with its instantaneous count higher than a threshold value may be selected as a particular day.

The speed setting part 132 determines the days with the sixth highest and lower instantaneous counts to be ordinary days different from the particular days (S82). Further, the speed setting part 132 determines and sets the copy speed schedule for the ordinary days. Specifically, on the day determined to be an ordinary day, the speed setting part 132 determines the record (history) of the copy speed level for the day with the lowest change count to be the copy speed level schedule for the first ordinary day of the next month (S83). The change count signifies the number of times the copy speed has been determined to be increased. The initial value of the copy speed level schedule for the ordinary days of each month is determined on the basis of the copy speed level of the ordinary day of the previous month with the smallest number of times the copy speed has been determined to be increased.

Low change counts signify that the performance value has continued close to the ideal value. The copy speed level schedule for the ordinary day with the lowest change count is stored into the record of the first ordinary day of the next month in the execution speed management table 850.

The speed setting part 132 determines the particular days on the basis of periodicity such as the day of the week or the end of the month from among the days with the highest instantaneous counts (S84). For example, in a case where at least the same three days of the week are included, these days of the week may be determined to be the particular days for the next month. Further, in a case where the last day of the month is included in the days with the highest counts, the last day of the next month may be determined to be the particular day. The days not covered by the periodicity of the days of the week or of the last day of the month may be determined to be the particular days of the next month. It is to be noted that the days with the sixth highest and lower instantaneous counts may be designated as the particular days. The days other than the particular days eventually become the ordinary days. The particular days are set in the speed adjustment count and particular day management table 860. In this manner, the particular days of the current month are selected according to the instantaneous counts indicating the number of times the copy speed level has been lowered.

Next, the speed setting part 132 determines the copy speed level schedule for the particular days (S85). For example, the speed setting part 132 determines the record (history) of the copy speed level of the day with the highest instantaneous count to be the copy speed level schedule for the particular days. The copy speed level for the particular days is stored into the record of the first particular day of the next month in the execution speed management table 850. The instantaneous count indicates the number of times the copy speed has been lowered. The initial value of the copy speed level schedule for the particular days of the next month is determined on the basis of the copy speed level of the day with the highest instantaneous count.

It is to be noted that the particular days may be further grouped. For example, the copy speed level schedule is determined for each particular day of the week, for the particular day at the end of the month, and for the particular day of a specific date. The record of the day with the highest instantaneous count from among the particular days of the same kind in the previous month may be used as the copy speed level schedule. Determination of the copy speed level schedule by the daily flow involves referencing the previous record of the particular days of the same kind.

Next, the speed setting part 132 extracts the data items with the fifth highest and lower instantaneous counts from the performance information management table 830 of the previous month (S86). Next, the speed setting part 132 calculates the rates of deviation between the ideal value and the actual value between the first day and the last day of the month for all the extracted data items with the fifth highest and lower instantaneous counts. The speed setting part 132 further compares an average of the calculated deviation rates with the threshold value LOW (S87).

In a case where the average deviation rate is less than the threshold value LOW, the speed setting part 132 increases by 10% the ideal values for the top five items with the highest instantaneous counts based on the records between the first day and the last day of the previous month (S88). The above process involves increasing the ideal values of the items for which the number of times the ideal values exceed is high, in a case where the number of times the records exceed the ideal values is high for only specific items whereas the remaining items have margins of tolerance relative to their ideal values.

As described above, in a case where the items, for which the number of times indicated by the instantaneous count and having led to lowering the copy speed level in a plurality of cycles is less than for other items, have values that are lower by a predetermined level than the corresponding ideal values (threshold values), the speed setting part 132 increases the ideal values (threshold values) for the items for which the number of times having led to lowering the copy speed level in the plurality of cycles is higher than for the other items. This makes it possible to appropriately increase the copy speed levels from the viewpoint of overall performance of the items. It is also possible to automatically modify the ideal values more appropriately from the viewpoint of overall performance. It is to be noted that the ideal values for both the particular days and the ordinary days may be increased by desired amounts. Modification of the ideal values may be carried out in cycles different from those in which the particular days are determined.

As described above, the bit, the instantaneous count, and the change count denote the histories of determination of the need to maintain, increase, and lower the copy speed level, respectively. The bit denotes the copy speed level to be set by the determination. The instantaneous count represents the number of times the copy speed level has been determined to be lowered as well as the number of times the copy speed level has been actually lowered. The change count stands for the number of times the copy speed level has been determined to be increased.

It is to be noted that the cycles of the three processes explained with reference to FIGS. 12A through 12D, 13, and 14 are not limited to the above examples. The cycle of the process explained with reference to FIG. 14 is the longest of the three processes; the cycle of the process explained with reference to FIGS. 12A through 12D is the shortest.

It is to be noted that the present invention is not limited to the embodiment discussed above and may also be implemented in diverse variations and equivalents. The embodiment above has been explained as detailed examples helping the present invention to be better understood. The present invention, when embodied, is not necessarily limited to any embodiment that includes all the configurations described above. Part of the configuration of one embodiment may be replaced with the configuration of another embodiment. Further, the configuration of a given embodiment may be supplemented with the configuration of another embodiment. Moreover, part of the configuration of each embodiment may be supplemented with, removed, or replaced by another configuration.

Further, the configurations, functions, processing units, and the like described above may be implemented partially or entirely by hardware through integrated circuit design, for example. Moreover, the configurations, functions, and the like described above may be implemented by processors running software as programs for implementing such configurations, functions, and the like. The information such as programs, tables, and files for implementing the functions may be held in storage devices such as memories, hard discs, and SSDs or retained on storage media such as integrated-circuit (IC) cards and secure-digital (SD) cards.

In addition, the control lines and information lines considered necessary for purpose of explanation are indicated in the drawings. The control lines and information lines required for product implementation may not all be included. In practice, almost all configurations may be considered to be connected with one another.

What is claimed is:

1. A storage apparatus comprising:
a storage controller configured to process an input request or an output request from a host; and
a storage device configured to store data from the host,
wherein the storage controller stores, for each of a plurality of volumes, a schedule indicative of a copy speed level for each of continuous time slots in a cycle,
the storage controller collects information regarding current performance of the storage controller and stores the collected current performance information into a memory, and
the storage controller determines the copy speed level for a next time slot indicated by the schedule, on a basis of the copy speed level for the next time slot and a relation between a value indicated by the performance information and a threshold value.

2. The storage apparatus according to claim 1,
wherein the storage controller copies data of a first volume among the plurality of volumes to a copy destination storage apparatus via a network,
the storage controller acquires the current performance information regarding the copy destination storage apparatus, and
the storage controller determines the copy speed level for the next time slot indicated by the schedule for the first volume, on a basis of the copy speed level for the next time slot of the first volume, the relation between the value indicated by the performance information regarding the storage controller and the threshold value, and a relation between a value indicated by the performance information regarding the copy destination storage apparatus and a threshold value.

3. The storage apparatus according to claim 1,
wherein the storage controller copies data of a first volume among the plurality of volumes to a copy destination storage apparatus via a network,
the storage controller acquires the current performance information regarding the copy destination storage apparatus,
the storage controller acquires the current performance information regarding the host,
the storage controller acquires current bandwidth information regarding the network, and
the storage controller determines the copy speed level for the next time slot indicated by the schedule for the first volume, on a basis of the copy speed level for the next time slot of the first volume, the relation between the value indicated by the performance information regarding the storage controller on one hand and the threshold values on the other hand, a relation between a value indicated by the performance information regarding the copy destination storage apparatus on one hand and a threshold value on the other hand, a relation between a value indicated by the performance information regarding the host on one hand and a threshold value on the other hand, and a relation between a value indicated by the bandwidth information on one hand and a threshold value on the other hand.

4. The storage apparatus according to claim 1,
wherein, the storage controller determines a need to maintain, increase, or lower the copy speed level for the next time slot indicated by the schedule, on the basis of the relation between the value indicated by the performance information and the threshold value,
the storage controller determines maintaining of the copy speed level for the next time slot, given the need to maintain or increase the copy speed level, and
the storage controller determines lowering of the copy speed level for the next time slot, given the need to lower the copy speed level.

5. The storage apparatus according to claim 4,
wherein the storage controller generates a history of the determinations of the need to maintain, increase, or lower the copy speed level during the cycle, and,
the storage controller prepares a schedule of the copy speed level for a next cycle on a basis of the generated history.

6. The storage apparatus according to claim 1,
wherein the cycle is one day,
the storage controller selects a particular day of a current month according to the number of times of lowering of the copy speed level on each day of a previous month, and
the threshold value is defined for each of the particular day and an ordinary day different from the particular day.

7. The storage apparatus according to claim 5,
wherein the cycle is one day,
the storage controller selects a particular day of a current month according to the number of times of lowering of the copy speed level on each day of a previous month,
the storage controller determines an initial value of the schedule for the copy speed level for the particular day of the current month on a basis of the copy speed level for the particular day of the previous month with a highest number of times the copy speed level has been determined to be lowered, and
the storage controller determines an initial value of the schedule for the copy speed level for the ordinary day of the current month different from the particular day on a basis of the copy speed level for the ordinary day of the previous month with a lowest number of times the copy speed level has been determined to be increased.

8. The storage apparatus according to claim 1,
wherein the performance information indicates values of a plurality of items,
the threshold value is set for each of the plurality of items, and
the storage controller, in a case where an item for which the number of times having led to lowering the copy speed level in a plurality of cycles is lower than for the other items has a value that is smaller than the corresponding threshold value by a predetermined level, increases the threshold value for the item for which the number of times having led to lowering the copy speed level in the plurality of cycles is higher than for the other items.

9. A copy control method for use by a storage apparatus,
the storage apparatus including a storage controller,
the storage controller storing, for each of a plurality of volumes, a schedule indicative of a copy speed level for each of continuous time slots in a cycle,
the copy control method comprising:

causing the storage controller to collect information regarding current performance of the storage controller and store the collected current performance information into a memory; and causing the storage controller to determine the copy speed level for a next time slot indicated by the schedule, on a basis of the copy speed level for the next time slot and a relation between a value indicated by the performance information and a threshold value.

* * * * *